July 8, 1969 R. W. KERR 3,454,179
HOLLOW RESINOUS ARTICLES

Filed April 10, 1967 Sheet 1 of 3

R.W. KERR, INVENTOR

BY *George R. Nummer*

ATTORNEY

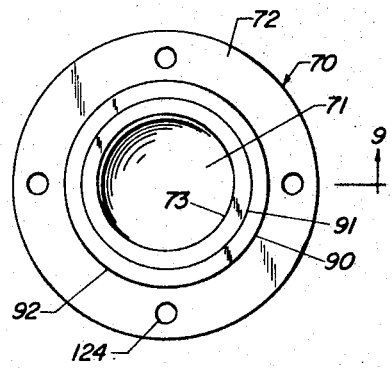
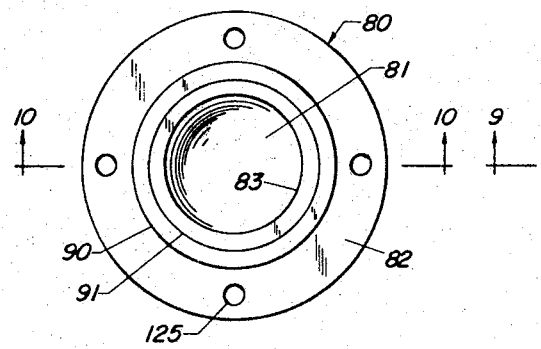
Fig. 7    Fig. 8
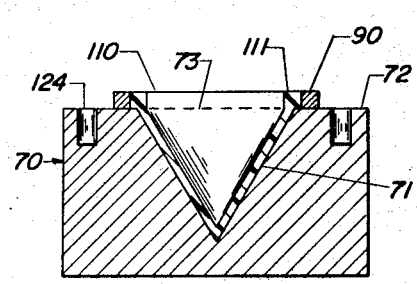
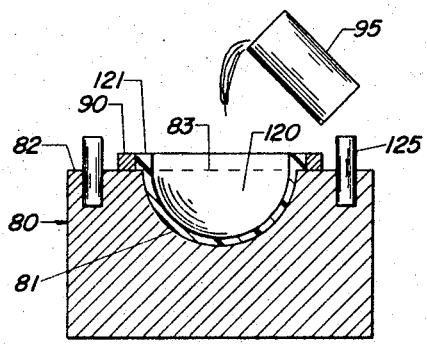
Fig. 10    Fig. 9
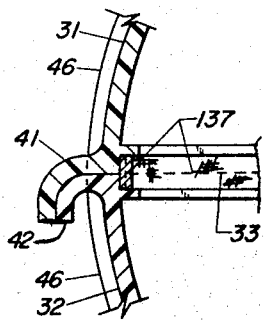
Fig. 15
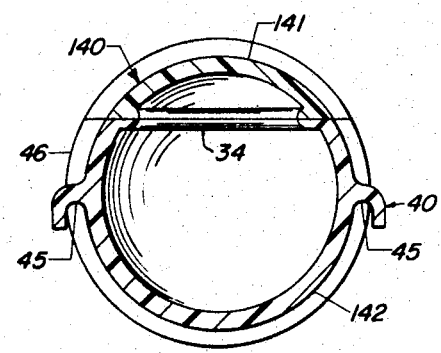
Fig. 16
R. W. KERR, INVENTOR
BY George R. Nimmer
ATTORNEY July 8, 1969 R. W. KERR 3,454,179
HOLLOW RESINOUS ARTICLES Filed April 10, 1967 Sheet 3 of 3

R.W. KERR, INVENTOR

BY *George R Nummer*

ATTORNEY

United States Patent Office 3,454,179
Patented July 8, 1969

3,454,179
HOLLOW RESINOUS ARTICLES
Raymond W. Kerr, 3731 N. 58th St.,
Lincoln, Nebr. 68529
Filed Apr. 10, 1967, Ser. No. 629,780
Int. Cl. B65d 7/12, 7/02, 7/34
U.S. Cl. 220—4  2 Claims

ABSTRACT OF THE DISCLOSURE

This invention relates to elongate storage tanks and other hollow articles that comprise a plurality of shell-like segments mutually joined together at a number of seam lines. In addition, this invention provides a method for making hollow articles that increases the structural strength thereof along the seam line junctures of the shell-like segments.

---

Tanks, balls, and other hollow objects comprising an imperforate thin external shell may be provided of resinous materials by two common methods of the prior art: the blow-molding process and the lamination process. With the blow-molding process a thermoplastic soft viscous thermoplastic balloon of elevated temperature is blown into a cavity-type mold having an exterior opening for the introduction of air pressure. After the thin-walled resinous balloon is made to conform to the shape of the mold internal cavity, the mold is cooled so as to dimensionally stabilize the thermoplastic resin balloon, thus resulting in the ultimate product. The blow-molding process is not adapted to the use of thermosetting resins structural materials because of the irreversible viscosity characteristics thereof, and consequently blow-molding is employed with thermoplastic resins only.

With the lamination process, two or more segments of the ultimate hollow object are made separately in separate molds. The several independent segments are then fitted together and adhered or otherwise laminated at the inter-segments seam lines. The primary disadvantage of the lamination process is that it is difficult to achieve both strong bonding of thin-walled segments and also externally inconspicuous inter-segments seam lines. Many times thin-walled segments are joined together with adhesives that protrude at the inter-segments seam lines to provide a very unsightly appearance. If the adhesive protrusion is removed as by a subsequent costly grinding operation, the structural strength of the hollow object deteriorates, it being found that the external protrustion, although unsightly, does enhance the structural strength of the article.

It is accordingly the general object of the present invention to provide an improved method for making hollow articles from resinous and other thermally-flowable structural materials.

It is a specific object of the present invention to provide a hollow article of resinous and other thermally-flowable structural materials by a unique lamination type process wherein the hollow article has an aesthetically appealing inconspicuous external seam line yet wherein there is provided at the internal seam line an integral strong weld between the segments to enhance the structural strength of the hollow article.

It is another object to provide multi-segment hollow resinous articles wherein there is provided internally within at the inter-segments seam lines a weld-like protrusion that attaches the several segments, the structural material of said weld-like protrusion being common to the structural material of at least one of the contiguous segments.

It is yet another object to provide an easily-transportable hollow resinous storage tank which may be made in accordance with the teachings of the present invention, said resinous storage tank being adapted for the internal weld-like protrusion feature to enhance the tank structural strength.

It is a further object to provide a novel method for making hollow articles comprising a plurality of mutually joined shell-like segments.

With the above and other objects and advantages in view which will become apparent as the description proceeds, the invention comprises the novel form, combination, and arrangement of parts and method steps as hereinafter more fully described, reference being had to the accompanying drawing wherein like numbers refer to like parts in the several views and in which:

FIGURE 7 is a top plan view of a molding apparatus appropriate to the making of the conical segment of the representative article shown in FIGURES 1 and 2.

FIGURE 8 is a top plan view of a molding apparatus appropriate to the forming of the hemispherical segment of the representative article shown in FIGURES 1 and 2.

FIGURE 9 is a sectional elevational view of the FIGURE 7 molding apparatus taken along line 9—9, the conical segment in its intermediate form being shown cast therein.

FIGURE 10 is a sectional elevational view of the FIGURE 8 molding apparatus taken along line 10—10, the hemispherical segment in its intermediate form being shown cast therein.

FIGURE 15 is a detail view similar to that of FIGURE 5 showing particularly the internal weld along the seam line resulting from the alternate method step of FIGURE 14.

FIGURE 16 is a sectional elevational view of another form of the hollow tank of FIGURES 3–6.

Figure 1:
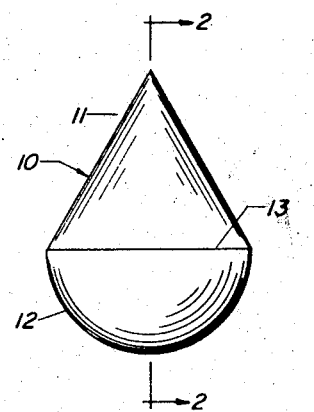
FIGURE 1 is a perspective view of a typical form of the multi-segment hollow resinous article of the present invention.

The hollow resinous article of the present invention comprises a plurality of shell-like molded segments attached together in abutting conterminous relationship along a number of externally inconspecuous seam lines with an internal resinous weld, the number of said seam lines being one less in number than the number of molded segments. For example, the hollow resinous article may take that typical form 10 of FIGURES 1 and 2 comprising a pair of shell-like molded resinous segments, including a conical segment 11 and a hemispherical segment 12 abutting each other at a common continuous seam line 13. There is a resinous weld e.g. bead-like protrusion 14, within article 10 along the entire annular seam line 13 and in structurally-continuous relationship with segments 11 and 12 to weldably attach said segments 11 and 12. The resinous bead-like weld 14 is of a resinous material that is common to the resinous structural material of segment 11 or segment 12, and preferably, the resinous structural material of segments 11 and 12 and inward protrusion 14 are identical. The exterior surface of article 10 is substantially devoid of outward protrusions along annular seam line 13, and hence, the seam line 13 is nearly invisible, or at least inconspicuous, to an externally positioned observer.

Figure 3:
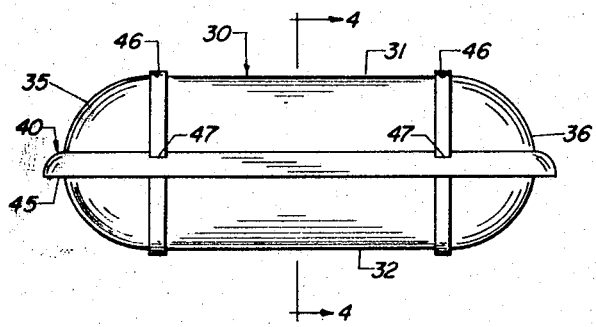
FIGURE 3 is a perspective view of a resinous dual-segment hollow tank article of the present invention.
Figure 4:
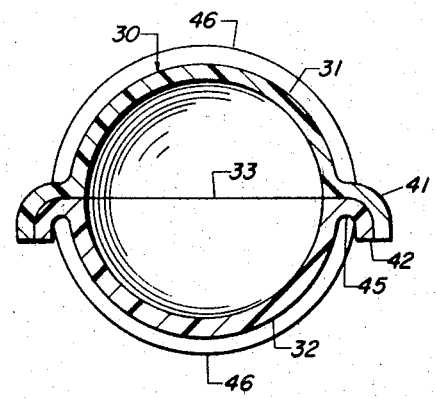
FIGURE 4 is a sectional elevational view taken along line 4—4 of FIGURE 3.
Figure 5:
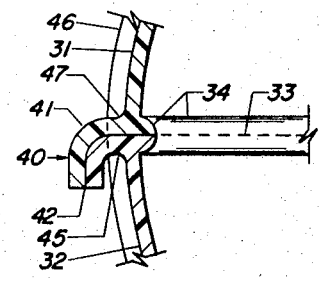
FIGURE 5 is a detail view of FIGURE 4 showing the interior resinous bead-like internal weld attachment for the two segments.

The generic hollow resinous article of the present invention may take the novel tank form 30 illustrated in FIGURES 3–5. Storage tank 30 is of a generally elongate cylindrical shape having rounded ends 35 and 36, and tank 30 comprises a pair of shell-like molded resinous segments including upper segment 31 and lower segment 32 abutting each other at a common annular seam line 33. As shown in FIGURE 5, there may be a resinous bead-like protrusion 34 within elongate tank 30 along the entire seam line 33 and in structurally-continuous relationship with segments 31 and 32 to weldably attach said segments 31 and 32. Resinous bead 34 is analogous to bead 14 and is, accordingly, of a resinous material that is common to the resinous structural material of segments 31, 32, and preferably, the resinous structural material of segments 31, 32 and resinous protrusion 34 are identical.

Upper shell-like segment 31 has a downwardly depending exterior flange or rim 41 along the entire peripheral edge thereof; rim 41 has a lower surface. Lower shell-like segment 32 has a downwardly depending exterior flange or rim 42 along the entire peripheral edge thereof; rim 42 has an upper surface and a downwardly-extending lower surface 45. The lower surface of flange 41 and the upper surface of flange 42 are of matching nestable configuration, and said two surfaces abut to define said seam line 33.

Tank 30 includes a circumferential flanged external handle 40 in the elongate direction of the tank 30, said flanged handle 40 being preferably in integral structurally-continuous relationship with the structural material of said tank. Flanged handle 40 desirably includes a downwardly extending lower surface e.g. 45, whereby the tank 30 may be manually grasped by draymen positioned on either side of tank 30 for convenient manual carriage thereof. Tank 30 may be reinforced by one or more flexible reinforcing bands 46 that tightly surround the exterior surface of tank 30, tending to pull segments 31 and 32 together. Reinforcing straps 46 are substantially normal to flanged handle 40, and each of said straps 46 intersects two perforate slots 47 of handle 40.

Figure 6:
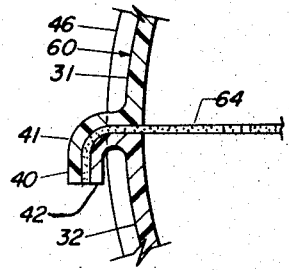
FIGURE 6 is a detail view similar to that of FIGURE 5 showing an adhesive attachment means for the two segments.

Although the novel tank structure 30 may include the internal weld-like protrusion 34 of the present invention to join segments 31 and 32, a separate adhesive layer 64 may be employed as shown in FIGURE 6. The tank structure 60 of FIGURE 6 is in all respects identical to tank 30 of FIGURES 3–5 except that a convenient adhesive layer 64 is employed to join segments 31 and 32 instead of the internal weld-like protrusion 34. The FIGURE 6 type embodiment has certain advantages from the standpoints of storage and transportation. Several upper segments 31 and several lower segments 32 may be nestably stored and transported, and assembly of the 31 and 32 segments may be readily effected by the ultimate user with conventional adhesives.

Figure 2:
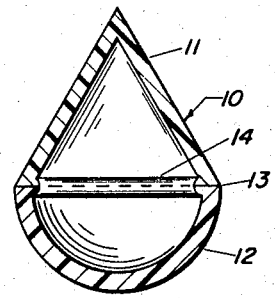
FIGURE 2 is a sectional elevational view taken along line 2—2 of FIGURE 1.

The novel method for making the typical hollow resinous article 10 of FIGURES 1 and 2 is shown in FIGURES 7–12. The method of the present invention requires the use of dimensionally stable cavity-type molds, said molds being conventionally employed in the art for molding resinous articles. For making multi-segment hollow resinous articles joined together with an internal weld-like resinous protrusion along the inter-segments seam line, molds having the appropriate cavity size and shape for the respective segments are required. The mold cavity has an annular peripheral border edge that completely surrounds the cavity, said annular border edge being at the juncture of the mold cavity and surrounding face. For example, typical hollow resinous article 10 requires two cavity-type molds 70 (of FIGURE 7) and 80 (of FIGURE 8). Mold 70 has a conical cavity 71 the dimensional size and shape of which is appropriate to the exterior size and shape of segment 11. Mold 70 has a face 72, herein planar and horizontal, that surrounds cavity 71, and there is the annular peripheral border 73 at the juncture of cavity 71 and face 72. Mold 80 has a hemispherical cavity 81 the dimensional size and shape of which is appropriate to the exterior size and shape of segment 12. Mold 80 has a face 82, herein planar and horizontal, that surrounds cavity 81, and there is the annular peripheral edge 83 at the juncture of cavity 81 and face 82. The respective faces 72 and 82 of molds 70 and 80 are mateably abuttable, and the respective annular peripheral edges 73 and 83 are of substantially identical size and shape.

An annular dam member 90 of substantially uniform thickness is removably attached to faces 72 and 82. Dam members 90 may be as gummed sheet material, so as to be removably adherent to mold faces 72 and 82. As can be seen in FIGURES 7–10, dam members 90 completely surround mold cavities 71 and 81, and annular inward edge 91 of removable dams 90 is preferably spaced a constant given distance from cavity peripheral edges 73 and 83.

As indicated in FIGURES 9 and 10, the next method step comprises applying a uniformly thick layer of a self-sustaining, though pressure-flowable, plastic substance to the surface of the mold cavity and also to the mold face to the annular peripheral edge 91 of dam member 90. The uniformly thick plastic layer e.g. 110, 120, is adherent to the cavitate and face portions of the mold, and the thickness of the plastic layer is substantially equal to, and does not exceed, the thickness of dam member 90. Dam member 90 is sufficiently adherent to the mold face so that the plastic layer will not seep between dam 90 and the mold face when the thickness of said plastic layer does not exceed the thickness of dam 90. The self-sustaining pressure-flowable plastic layer may comprise, for example, heated thermoplastic resinous materials, incompletely cured thermosetting resinous materials, or heated metallic substances having fusion temperatures less than the fusion temperature of the mold itself. Application of the plastic layer to the mold is schematically shown in FIGURE 10, wherein careful pouring of a heated thermoplastic resin from container 95 is employed. However, it is recognized that there are many possible methods for applying the uniform thickness layer of plastic material, and accordingly, it is not desired to so limit the present invention. Upon application of the plastic layer to the molds, for example plastic layer 120 form mold 80 and plastic layer 110 for mold 70, the dam members 90 are carefully removed from mold faces 72 and 82 so as not to disturb the peripheral lips 111 and 121 of plastic layers 110 and 120, respectively. As indicated in FIGURE 11, self-sustaining lip portions 111 and 121 are removably adherent to mold faces 72 and 82, respectively.

Figure 11:
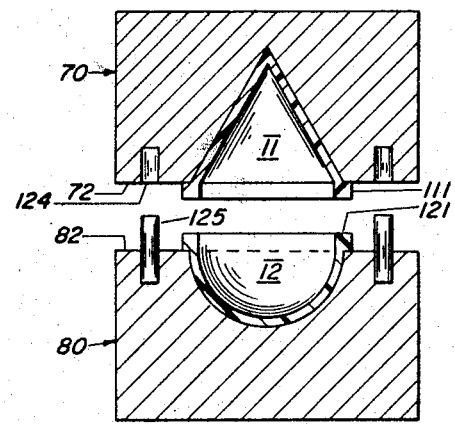
FIGURE 11 is a sectional elevational view showing the molding apparatuses and the intermediate forms of the conical and hemispherical segments of FIGURES 9 and 10 overlying relationship according to the method of the present invention.
Figure 12:
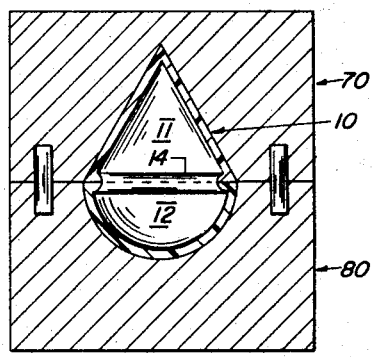
FIGURE 12 is a sectional elevational view to show the method step following that of FIGURE 11 to provide the article of FIGURE 1.

It can be seen from FIGURES 7–11 that the combination of plastic layers 110 and 120 generally resemble hollow resinous article 10 of FIGURES 1 and 2 except for the presence of outwardly-extending annular lip portions 111 and 121. The next method step comprises laterally contracting the respective annular lip portions 111 and 121 so as to provide the internal weld along seam line 13, herein as bead-like resinous protrusion 14. The contraction of annular lips 111 and 121 is illustrated in FIGURES 11 and 12 and comprises firmly abutting mold faces 72 and 82 so as to squeezably contract lips 111 and 121. It is essential that the portions of mold faces 72 and 82 to which lips 111 and 121 are adhered have a high degree of conformable mateability so that lips 111 and 121 will contractably recede inwardly from cavity edges 73 and 83 so that the exterior surface of article 10 will have an inconspicuous seam line 13. During the abutment step of mold faces 72 and 82, it is essential that congruent peripheral edges 73 and 83 of mold cavities 71 and 81 be in vertically aligned conterminous relationship so as to promote the making of an externally inconspicuous seam line 13. To insure the vertical alignment of congruent peripheral edges 73 and 83 during abutment step, mold alignment means are employed, as for example the combination of dowel pins 125 extending into positioned holes 124 in the respective mold faces. Preferably the holes 124 of said mold alignment means are positioned externally of the outward edge 92 of removable dam member 90.

During the squeezable contraction of annular lips 111 and 121 cohesion and molecular admixture of plastic layers 110 and 120 result, and such molecular admixture is desirable to the formation of a strong internal weld 14. Thus, in the case of thermoplastic resin or metallic plastic layers, the plastic layer should be maintained in the pressure-flowable state during the squeezable contraction step. Then, upon the formation of internal weld 14, the plastic layers are allowed to cool, as by lowering the temperature of the mold with conventional cooling means, so as to harden and dimensionally stabilize the article 10 including its internal weld 14. In the case of the thermosettable plastic layers, the squeezable contraction step must be completed before the resinous layer is fully cured so that curing will continue after the weld 14 has been formed. Although it is desirable that the structural material for the various segments of the hollow article 10 including its internal weld 14. In the case of hance the strength of the internal weld-like protrusion e.g. 14 and 34, it is necessary only that there be a degree of cohesion between the segments thereof at the protrusion. With thermoplastic materials the cohesion may be as a molecular intermingling, and with thermosetting resinous materials the cohesion may be as intra-molecular cross-linking and/or molecular intermingling. After the hollow article has been dimensionally stabilized, as by cooling for example, the molds are separated and the unitary article removed therefrom.

Figure 13:
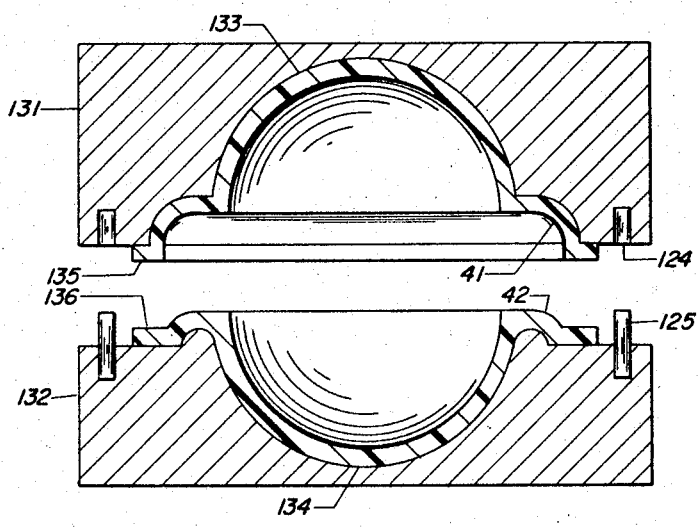
FIGURE 13 is a sectional elevational view showing the FIGURE 11 method step with molding apparatus appropriate to the tank of FIGURE 3.

The method steps for making the elongate hollow tank 30 of FIGURES 3–5 are identical to those already described in conjunction with FIGURES 7–12 for typical article 10. Of course, the mold cavities must be appropriate to the contour of tank segments 31 and 32, and such appropriate molds 131 and 132 are indicated in FIGURE 13. Plastic layer 133 in mold 131 has peripheral lip 135, and plastic layer 134 in mold 132 has peripheral lip 136; internal bead-like weld 34 results upon the squeezable contraction and cohesion of peripheral lips 135 and 136.

Figure 14:
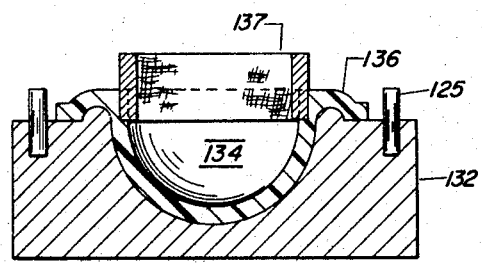
FIGURE 14 is a sectional elevational view similar to that of the lower half of FIGURE 13 to illustrate yet another alternate method step for joining the respective shell-like segments.

The method described in FIGURE 14 differs slightly from that of FIGURE 13 in that, before molds 131 and 132 are abutted together, a porous relatively stiff sheet material 137 is at least partially embedded into plastic layer 134 of lower mold 132, said porous reinforcing sheet 137 protruding above plastic layer 134 toward upper plastic layer 133. As molds 131 and 132 are abutted and pressed together so as to contract lips 135 and 136, said contracting lips 135 and 136 flow into and around porous reinforcing sheet 137 and the resultant weld resembles the configuration of FIGURE 15 rather than the bead-like weld 14 of FIGURE 5. The resultant internal weld configuration of FIGURE 15 is stronger than that of FIGURE 5 because of the presence of porous reinforcing sheet 137 for layers 133 and 134. Of course, this alternate method step utilizing the porous reinforcing sheet e.g. 137, may be employed generally with the teachings of the present invention, as with representative article 10 of FIGURE 1.

The alternate tank embodiment 140 of FIGURE 16 differs from embodiment 30 of FIGURES 3–5 in that: upper segment 141 is shallower than is segment 31; lower segment 142 is deeper than is segment 32; and the handle 40 having downwardly extending lower surface 45 is attached to lower segment 142 well below the inter-segments juncture i.e. below bead-like weld 34.

While the hollow articles 10 and 30 described as exemplifying the present invention comprise two segments and accordingly employ two molds, it will be appreciated that three or more segments may be similarly combined and joined with bead-like internal welds to form a unitary hollow object. It is, of course, necessary that the cavity-type molds be mutually abuttable at their faces in order to contract the plastic lips e.g. 111, upon squeezing the molds together.

From the foregoing, the construction and method for making the elongate tank and other hollow objects of the present invention will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to.

I claim:
1. A hollow resinous article comprising a plurality of shell-like molded resinous segments adherently joined together, said plurality of molded segments being abuttably attached together at a number of seam lines, said number of seam lines being one less in number than the number of shell-like segments, a resinous inward-protrusion of a resinous substance along the seam holding the abutting segments together, said resinous inward-protrusion being a molecular admixture of the resinous substances comprising the abutting segments, said resinous molecular admixture rendering each of said seam lines visually non-discernible along the inward-protrusion when viewed from the interior side of the hollow resinous article, each of said seam line junctures at the exterior side of the hollow resinous article being substantially devoid of a resinous protrusion.

2. The hollow resinous article of claim 1 wherein at least one of the inwardly protruding resinous welds is reinforced with a porous sheet material at least partially embedded within said inwardly protruding weld, said reinforcing sheet material spanning the seam line juncture of said at least one internal weld.

References Cited

UNITED STATES PATENTS

| 1,682,403 | 8/1928 | Murray | 220—4 X |
| 2,161,402 | 6/1939 | Arutunoff | 206—1 |
| 2,928,567 | 3/1960 | Davis | 220—75 X |
| 3,061,248 | 10/1962 | Jones | 220—4 X |
| 3,100,172 | 8/1963 | Nier. | |
| 3,142,422 | 7/1964 | Mjonnier | 220—4 X |
| 3,302,813 | 2/1967 | Schaich | 220—4 |

GEORGE E. LOWRANCE, Primary Examiner.

U.S. Cl. X.R.

150—.5; 215—1; 220—5, 80, 81